United States Patent [19]

Rudolph et al.

[11] 4,006,518
[45] Feb. 8, 1977

[54] TURRET LATHE

[75] Inventors: Richard C. Rudolph; Ernest J. Henkel; Michael A. Glandt, all of Fond du Lac; Daniel J. Seichter, New Holstein, all of Wis.

[73] Assignee: Giddings & Lewis, Inc., Fond du Lac, Wis.

[22] Filed: Aug. 30, 1974

[21] Appl. No.: 501,869

[52] U.S. Cl. .................................. 29/39; 29/27 R; 82/36 A
[51] Int. Cl.² .......................................... B23B 3/18
[58] Field of Search ........... 82/2 R, 2.7, 2 D, 36 A; 29/39, 27, 36, 39, 40; 408/35

[56] References Cited
UNITED STATES PATENTS

| | | | |
|---|---|---|---|
| 1,227,486 | 5/1917 | Newman et al. | 82/36 A X |
| 2,657,453 | 11/1953 | Brodhun | 82/36 A |
| 2,685,122 | 8/1954 | Berthiez | 408/35 X |
| 2,703,920 | 3/1955 | Parker | 82/2 D X |
| 3,288,003 | 11/1966 | Luebkemann | 82/2 R |
| 3,486,209 | 12/1969 | Shultz et al. | 82/36 A X |
| 3,643,307 | 2/1972 | Ledergerber et al. | 29/38 B |
| 3,750,245 | 8/1973 | Kennedy et al. | 82/36 A |
| 3,846,880 | 11/1974 | Foll et al. | 29/36 A |

*Primary Examiner*—Othell M. Simpson
*Assistant Examiner*—W. R. Briggs
*Attorney, Agent, or Firm*—Leydig, Voit, Osann, Mayer & Holt, Ltd.

[57] ABSTRACT

A horizontal bed turret lathe including a slant carriage adapted to achieve the advantages of a slant bed configuration while avoiding the disadvantages thereof. The slant carriage is mounted on a pair of horizontal bed ways offset to the rear of the spindle axis, and includes a pair of inclined slide ways for supporting a tool slide. A turret mounted on the tool slide has a pair of toolholders arranged in stacked configuration on the turret axis. For reducing interference from non-working tools and the turret assembly itself, the turret axis is skewed with respect to the spindle axis. To compensate for the skew of the turret axis, the toolholders are frusto-conical in shape, the degree of conical taper allowing each tool to be indexed to a normal operative position. An orderly tool arrangement is achieved by mounting end working tools in the upper toolholder and turning tools in the lower toolholder, the overall configuration allowing both end working and turning tools to operate up to the face of the chuck. Additionally, a tailstock may be conveniently provided on a pair of auxiliary ways, the overall configuration minimizing interference from the tailstock. The slant carriage is further stabilized by folding the slide drive and slide counterbalance assembly back into the carriage thereby lowering its center of gravity.

18 Claims, 13 Drawing Figures fig. 4.

TURRET LATHE

This invention relates to lathes, and more particularly to an improved turret lathe particularly adapted for use with a two-axis numerical control.

The horizontal bed lathe is a common configuration, generally having a pair of bed ways in a horizontal plane below the spindle axis for supporting a tool slide. Machines of this sort have an inherent disadvantage in that chips and coolant fall directly onto the bed ways tending to distort the machine components thereby limiting accuracy.

The use of numerical controls for increasing the productivity of turret lathes stimulated the design of alternate configurations wherein the bed ways were removed from below the spindle axis. Two lathe configurations particularly suited for use with numerical control are characterized as vertical bed and slant bed lathes. In a common vertical bed configuration, two bed ways are generally positioned in a vertical plane for supporting a horizontally positionable carriage, the carriage in turn having a pair of vertical ways for supporting a vertically positionable slide. In the slant bed configuration, a pair of bed ways are provided, with one way above and to the rear of the other, to define the slant plane of the carriage. A pair of cross ways are provided on the face of the carriage for positioning a tool slide along the inclined plane of the carriage face.

While both of the vertical and slant bed configurations serve to clear the area below the spindle axis thereby to provide for ease of chip removal, they introduce a disadvantage in that they complicate the structure of the bed itself. It is easily appreciated that the height of the bed must be increased to at least that of the uppermost way which is generally above the spindle axis, greatly increasing the size, weight, and cost of the bed.

A second aspect of achieving a truly versatile turret lathe is the capability of mounting a plurality of tools in a manner adapted to allow the maximum utilization of each tool. It should be noted at this point that lathe work may be broadly categorized as bar work (utilizing mainly turning tools on a relatively short workpiece), chucking work (utilizing mainly end working tools on a relativley short workpiece), or shaft turning work (utilizing turning tools on an elongated workpiece supported by a tailstock).

One approach to increasing versatility in order to perform more than a single class of work has been to provide a slide having two turrets thereon, one for turning tools and the other for end working tools. This approach, which may be adapted to perform both bar and chucking work, has an obvious disadvantage in that two relatively expensive indexing turret assemblies must be provided. Additionally, the turrets must be spaced to minimize interference between tools in the respective turrets. Very often this spacing is achieved at the expense of increasing the amount of required carriage and/or slide travel, with a resulting increase in cost of the machine itself and the position feedback network. Finally, while certain lathes using this approach may be adapted for shaft turning work, the incorporation of a tailstock is often accomplished at the expense of tooling flexibility.

It has been suggested that an elongated toolholder, or two stacked toolholders, be arranged on the axis of a common turret to resolve certain of the foregoing tooling problems. Such an approach dispenses with the need for a second turret assembly, and also may serve to decrease the required amount of slide or carriage travel. However, machines using this concept, while being relatively flexible in providing a plurality of ready tools have generally been limited to chucking or bar work. More specifically, the lower tool block prohibits the use of a tailstock; the length of the workpiece on which turning may be efficiently performed is accordingly limited.

It has additionally been suggested to utilize a "crown turret" which is skewed at an angle with respect to the spindle axis in order to provide a plurality of turning tools around the periphery of the crown while allowing the use of a tailstock. However, machines of this type are generally dedicated to shaft work and have only limited end working capability, generally provided by a second turret.

With the foregoing in mind, it is a general aim of the present invention to provide a turret lathe which is highly accurate and versatile, but which may be inexpensively manufactured. In carrying out that aim, it is an object to utilize only a single turret assembly configured for maximum flexibility and for minimizing the range of movement of the machine elements consonant with the intended machine capacity. A further object in carrying out the aforementioned aim is to provide a turret lathe in which the bed construction is simplified, but provides the necessary rigidity.

A related objective of the present invention is to provide a turret lathe which, although inexpensively manufactured, has the capability to perform a plurality of classes of machining including chucking, bar and shaft turning work. In that regard, it is a more detailed object to provide a turret lathe having a pair of toolholders on a single turret axis for mounting a plurality of end working and turning tools, the configuration being adapted to achieve the maximum utilization of each tool.

According to another aspect of the invention, it is a general goal to provide a turret lathe which achieves the benefits of the slant carriage arrangement, while avoiding the shortcomings thereof. In that regard, it is an object to provide such a turret lathe wherein the overall bed height is minimized. In accomplishing the foregoing, it is a more specific object to provide a turret lathe having a slant carriage mounted on a pair of horizontal bed ways offset behind the axis of the spindle.

These and other objects are achieved according to the present invention by the provision of a turret lathe having a horizontal bed for supporting a pair of bed ways in a horizontal plane offset behind the spindle axis. A carriage, mounted for rectilinear translation on the bed ways, includes a pair of slide ways defining a slant plane parallel to the spindle axis, but inclined with respect to the vertical. A tool slide, mounted for rectilinear translation on the slide ways, has a single turret mechanism provided thereon for indexing first and second tool blocks, carrying end working tools and turning tools respectively. The turret axis, which is common to the axes of the tool blocks, intersects the spindle axis, but is skewed with respect thereto so that interference from non-working tools is minimized. The turret skew allows the use of a tailstock which may be supported on a pair of auxiliary ways.

Further details of the invention and additional objects and advantages will become apparent from the following detailed description when taken in conjunction with the drawings in which.

Turning now to the drawings, and particularly to FIGS. 1-3 and 5, there is illustrated a turret lathe constructed in accordance with the present invention. A bed 30, which is generally L shaped in plan view, forms the supporting lathe structure. A headstock 31 is mounted on the shorter leg of the "L" and is bolted thereto in a position precisely aligned by a locating key (not shown). Supported for rotation within the headstock 31 is a spindle 32 having a chuck 34 attached thereto. A spindle drive including drive motor 35 is coupled to the headstock, such as by V-belts 36, for rotating the spindle and chuck about the spindle axis. The headstock and drive, which are relatively conventional in design, in a preferred form include a two-speed headstock transmission and a d.c. motor having a variable speed drive for achieving infinitely variable wide range spindle speed control.

According to an important aspect of the invention, the longer leg of the L-shaped bed 30 provides a generally horizontal surface offset behind the axis of the spindle 32 for supporting the carriage, slide and turret assembly generally indicated at 38. As best seen in end view in FIG. 3, the bed structure is quite low as compared with slant or vertical bed configurations, thereby decreasing the mass of the machine. However, this weight reduction is not achieved at the expense of rigidity, as the internal bed construction is provided with suitable x-type cross braces to withstand the resulting machining forces. The comparative ease of fabricating and machining such a bed will be apparent from the illustrated embodiment.

Figure 2:
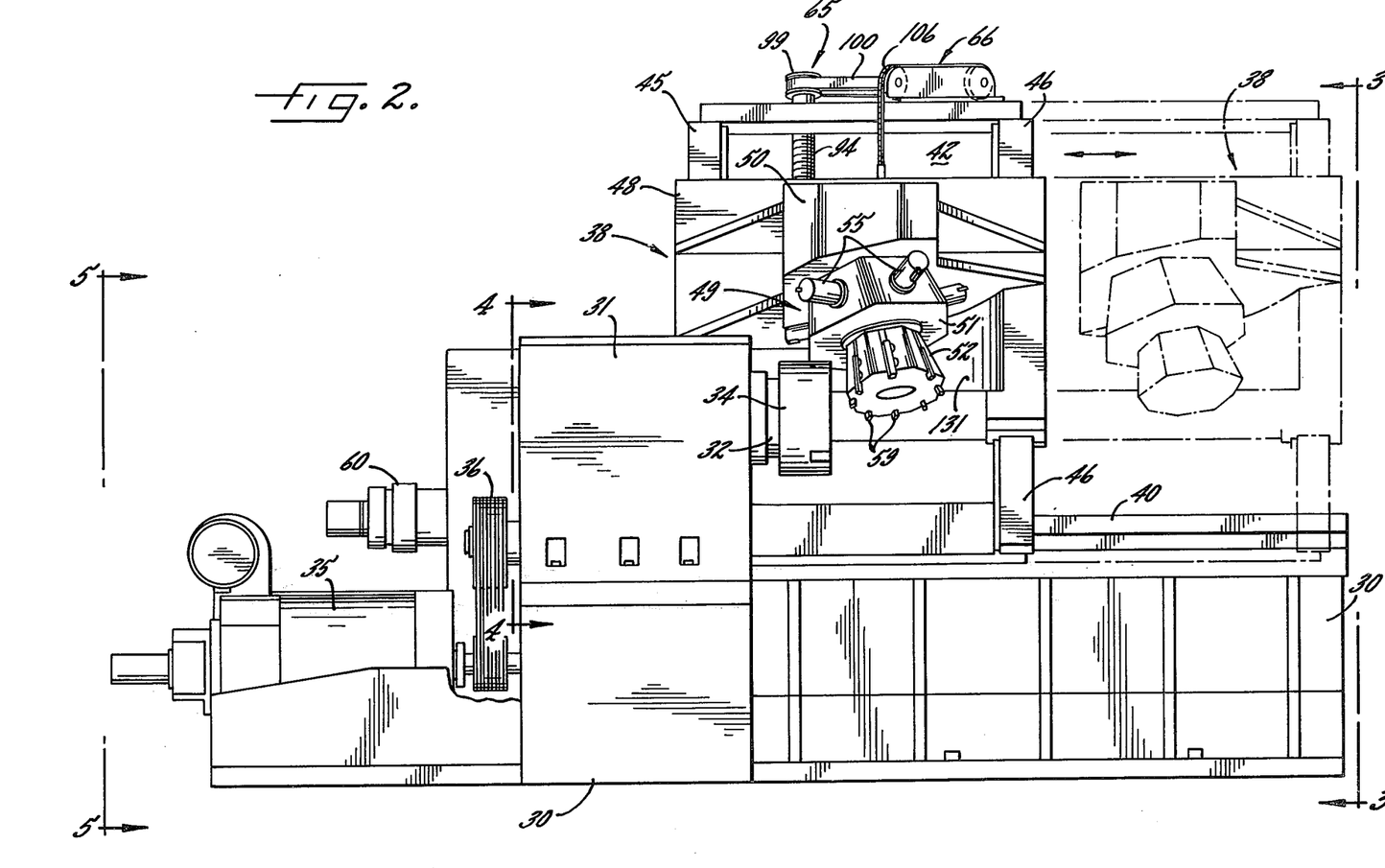
FIG. 2 is a front elevational view of a similar turret lathe with tail stock and chip conveyor removed.
Figure 3:
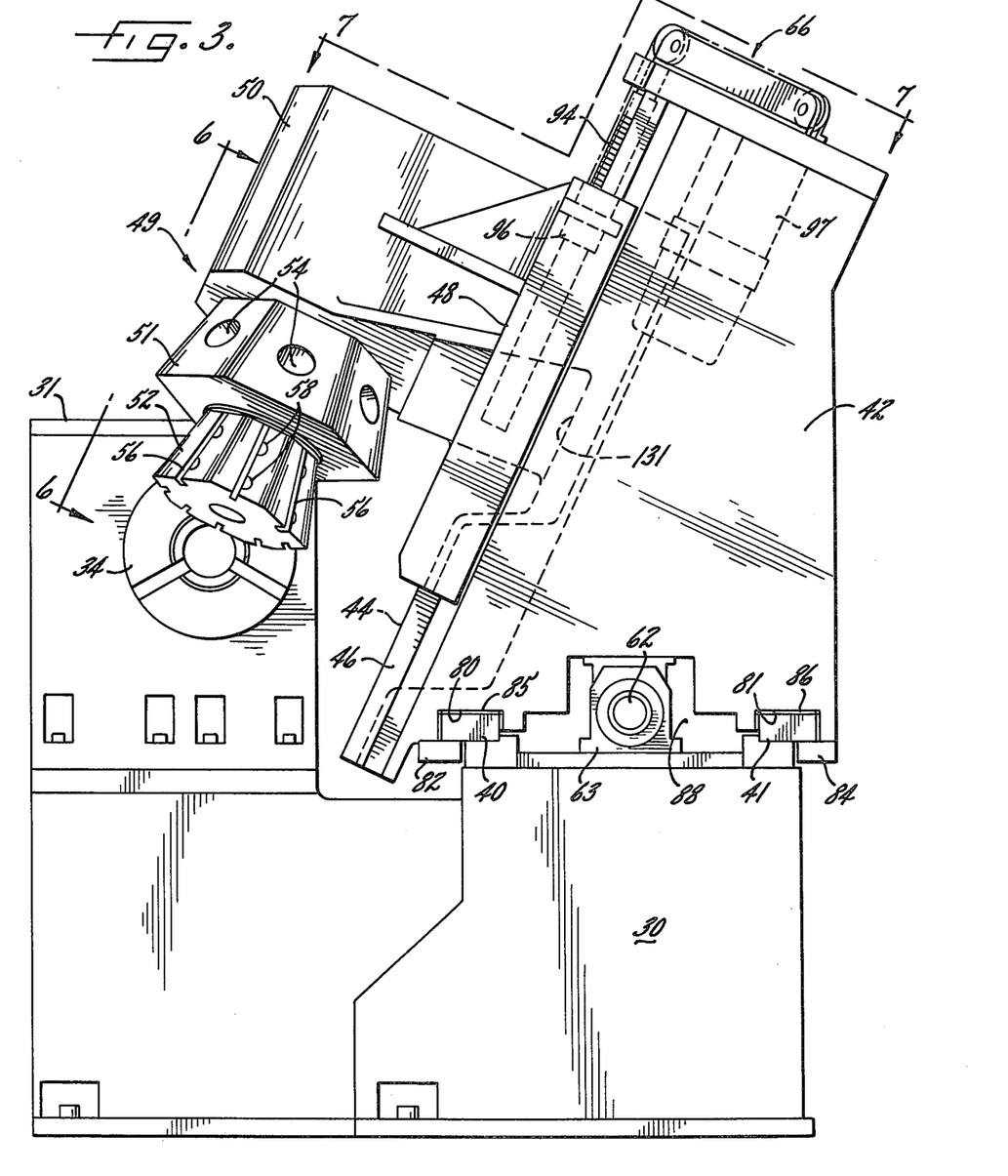
FIG. 3 is a side elevational view taken along the lines 3—3 of FIG. 2.

Supported on the bed in a horizontal plane are a pair of bed ways 40, 41, parallel to each other and to the spindle axis from which they are offset. Mounted for rectilinear translation on the bed ways is a carriage 42 having an inclined front face 44. The front face 44 of the carriage 42 carries a pair of upwardly inclined slide ways 45, 46, which define a plane which is slanted with respect to the horizontal plane of the bed ways. A tool slide 48 is mounted for rectilinear translation on the slide ways, and includes a turret assembly generally indicated at 49. Formed integral with the slide 48 is an upstanding housing 50 which carries the turret indexing components to be described in more detail below. As clearly shown in FIG. 1, the turret housing 50 is generally cylindrical and terminates at its lower end in a plane which is skewed with respect to the horizontal; the turret components are arranged so that the turret axis intersects the axis of the spindle, but is skewed with respect thereto. The skew angle is best appreciated with reference to FIG. 2, while the slant angle of the carriage face is best illustrated in FIG. 3.

For holding a plurality of tools, each readily indexable into an operative position to perform machining functions, a pair of tool blocks 51, 52 are arranged in stacked configuration to share the turret axis. This arrangement not only dispenses with the need for a second turret mechanism, but, as will become more apparent, arranges the tools in a manner to minimize interference from nonworking tools.

In practicing the invention, both of the tool blocks 51, 52 are made frusto-conical in shape, with the angle of conical taper equal to the angle at which the turret axis is skewed from the vertical in order to compensate for the skew angle of the turret axis. In other words, the angle of conical taper complements the angle at which the turret axis intersects the spindle axis, so that each tool when indexed to the operative position (nearest the chuck), is presented to the workpiece in a non-skewed attitude. For conveniently mounting a plurality of lathe tools, the tool blocks have regularly spaced flats machined on the conical surface. The upper tool block 51 includes a plurality of tool sockets 54, adapted to receive end working tools, such as tools 55. The toolblock 51 is also arranged to accept flange mounted toolholders (not shown) as an alternative means of mounting end working tools. The lower tool block 52 includes a plurality of slots 56 and associated clamps 58 for mounting turning tools, such as tools 59. In the illustrated embodiment, the upper tool block 51 is adapted to receive six end working tools while the lower tool block 52 is adapted to receive eight turning tools. It will be appreciated that the illustrated configuration of stacked tool blocks on a skewed axis provides a tool arrangement which is neatly ordered, which dispenses with the need for extensive carriage or slide travel to bring a new tool into operative position, and which minimizes interference from the turret and from the nonworking tools.

Figure 1:
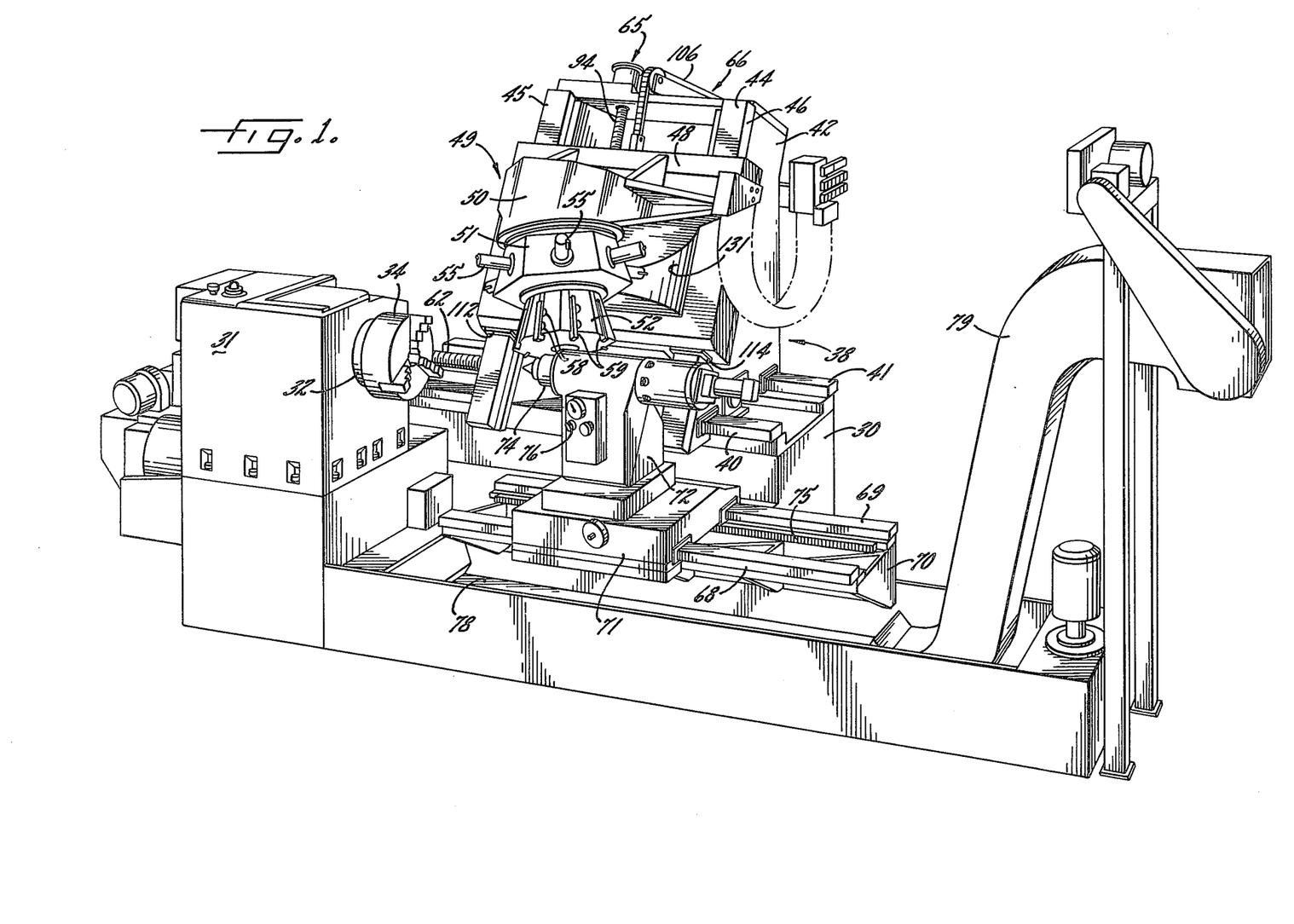
FIG. 1 is a perspective view illustrating a turret lathe constructed in accordance with the present invention.
Figure 5:
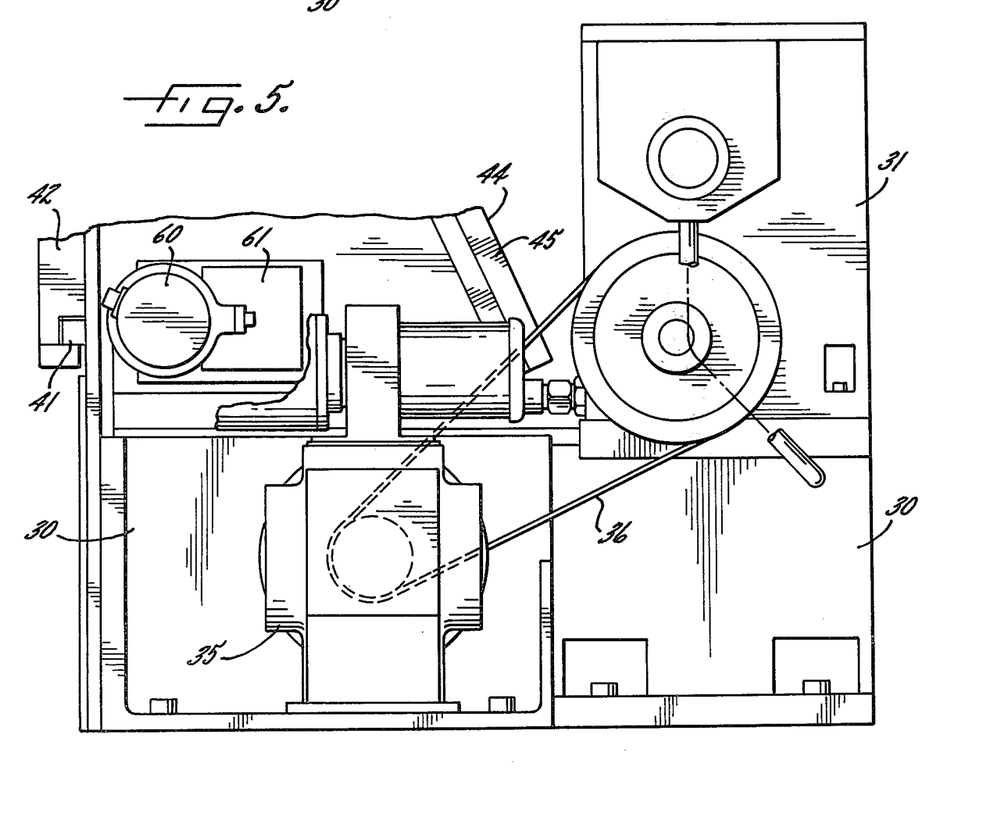
FIG. 5 is a partial side elevation taken along the lines 5—5 of FIG. 2.

A carriage drive is provided for translating the carriage 42 along the bed ways 40, 41, thereby to move a tool in the operative position along a path which is parallel to the spindle axis. As best shown in FIG. 5, the carriage drive includes a drive motor 60, and a gear housing 61 for rotating a feed screw 62 (FIG. 1). The feed screw 62 which is disposed between the bed ways 40, 41 and supported by bearing blocks 63 (FIG. 3) engages a feed nut 64 affixed to the carriage 42 by bolts 67. Accordingly, rotation of the motor 60 causes the translation of the carriage 42 toward or away from the headstock along the bed ways 40, 41.

For positioning the tool slide 48 along the slide ways 45, 46 slide drive and slide counterbalance mechanisms, generally illustrated at 65 and 66 respectively, are mounted within the carriage. The particular structure of the slide drive and counterbalance mechanisms will be described in more detail below.

As a further feature of the invention, a tailstock may be provided for supporting elongated workpieces. To that end, a pair of auxiliary ways 68, 69 are supported in a horizontal plane below the spindle axis on a bed extension 70. The bed extension 70, which is preferably an integral part of the bed 30 suspended in a cantilever fashion, includes a plurality of ribs and cross braces best shown in FIG. 1 for providing a rigid support while allowing chips and coolant to fall through the supporting structure. Mounted upon the auxiliary ways 68, 69 is a tailstock carriage 71 on which is supported the tailstock assembly 72 including an extendable quill 74, which may have a live center if desired. The tailstock is positioned along the auxiliary ways by means of a stationary rack 75 engaged by a driven pinion (not shown) which is in turn affixed to the tailstock carriage 71. The tailstock may be positioned, just as the other lathe elements are controlled, by means of a numerical control (not illustrated). Additionally, for achieving manual control of the tailstock, an operator accessible switch 76 is coupled in the circuit of the tailstock drive.

A chip pan 78 is disposed below the spindle axis to collect the chips machined from a workpiece. The chip pan 78 also serves as a coolant trough to collect and redistribute the fluid coolant. If desired, a chip conveyor generally indicated at 79 may be provided for removing chips and depositing them in a suitable receptacle (not shown).

Figure 6:
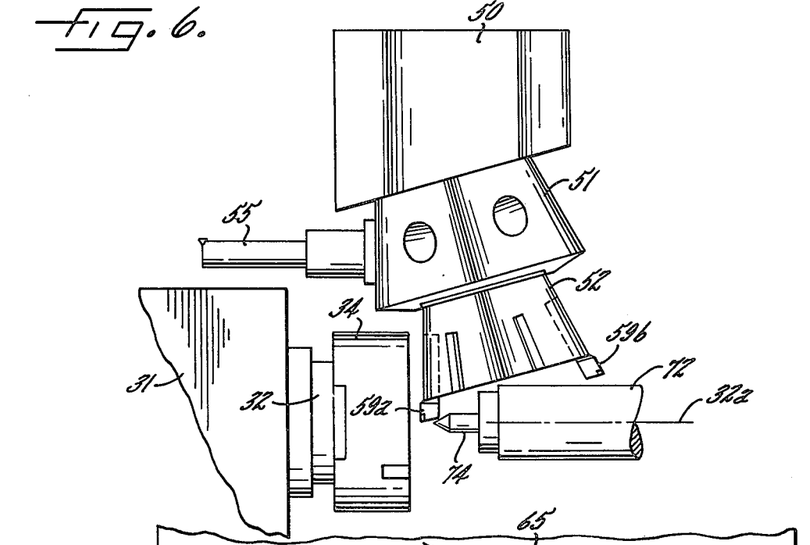
FIG. 6 is a partial view showing the turret assembly taken generally along the lines 6—6 of FIG. 3.

Turning now to FIG. 6, there is shown a portion of the described turret lathe illustrating certain of the capabilities of the configuration set forth in detail above. More specifically, there is illustrated the access of a selected tool 59a to the spindle axis 32a free from interference from nonselected tools such as tools 55 and 59b. It is seen that the carriage may be positioned to bring the selected turning tool 59a up to the face of the chuck 34 without interference from nonselected tools. The nonselected end working tool 55 extends beyond the chuck and beyond the headstock, even when the selected tool is brought to the spindle axis. The length of the frusto-conical lower tool block 52 allows the turning tools to be indexed to the spindle axis, without causing the upper tool block 51 to interfere with the chuck 34, or the turning tools 55 with the headstock 31. As best shown in FIG. 1, the headstock 31 has the rear corner thereof relieved in order to provide clearance for even relatively long boring bars. It will be apparent that similar clearances are provided when the carriage and slide are positioned to bring selected end working tools 55 into operative position. A further important feature of the configuration is the ability to bring the tailstock 72 into close relationship with the turret with minimal extension of the quill 74. It is seen that the skew angle of the turret prevents the nonselected tools such as tool 59b from interfering with the tailstock, even when the selected tool is lowered right to the spindle axis.

Figure 4:
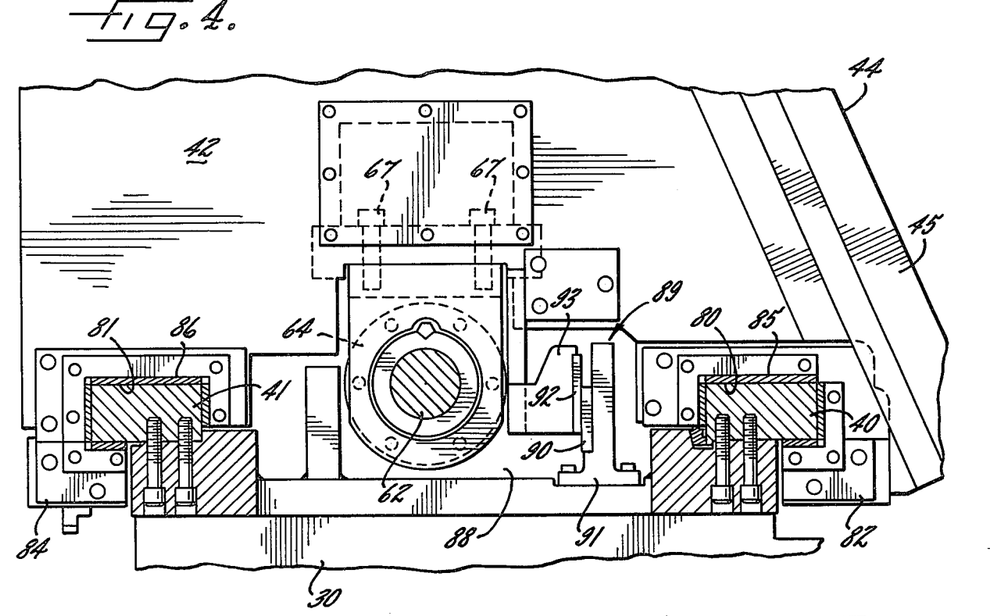
FIG. 4 is a partial sectional view taken along the lines 4—4 of FIG. 2.

Turning now to the carriage in more detail, and referring to FIGS. 3 and 4, it is seen that the bottom of the carriage is provided with a pair of way slots 80, 81 for supporting the carriage on the bed ways. The carriage is restrained on the bed ways by suitable clamping blocks 82, 84 which are affixed to the carriage such as by bolts (not shown). For reducing friction between the carriage and the ways, the way slots are provided with way bearings 85, 86, which preferably are plane bearings to which a low friction bearing material, such as that sold under the trademark "Rulon," has been secured by an adhesive.

Disposed between the way bearing slots 80, 81 is a channel 88 for receiving the carriage feed screw 62. The feed screw, which is preferably a ball screw, is engaged by the feed nut 64, fastened to the upper surface of the channel 88 by means of bolts 67. Also disposed in the channel 88 is the carriage position feedback system including a linear position transducer, generally indicated at 89, such as that sold under the trademark "Inductosyn." The linear position transducer 89 comprises an elongated scale 90 affixed to the bed 30 by a bracket 92 and a slider 92 secured to the carriage 42 by a bracket 93. An output signal from the transducer 89 is utilized in a numerical control system (not shown) to control the carriage feed motor 60.

As best shown in FIG. 3, the face of the carriage 42 forms a plane parallel with the spindle axis, but which is inclined rearwardly therefrom. In the illustrated configuration, it is preferred to incline the carriage face at an angle of approximately 25° from the vertical. This arrangement not only provides the increased operator access to the machining area as contemplated by slant designs, but also causes the forces resulting from machining operations to be directed between the bed ways 40, 41, increasing the overall machine stability.

Figure 7:
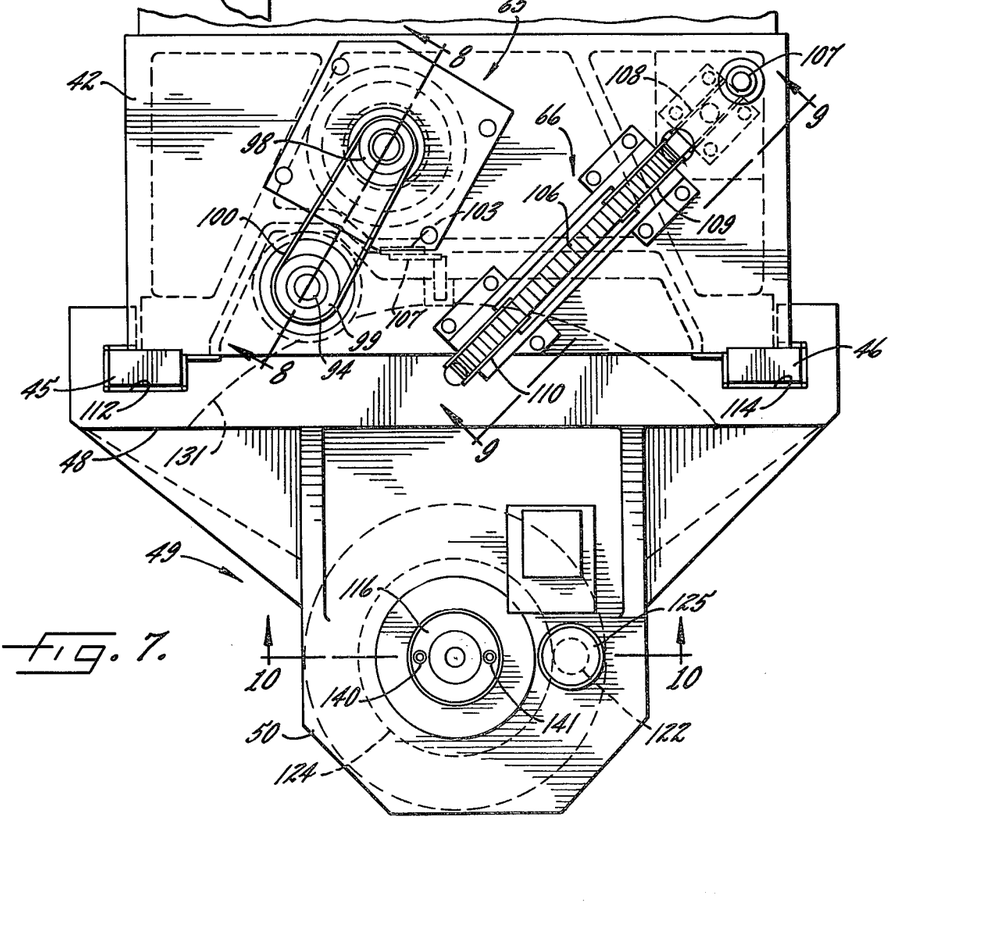
FIG. 7 is a partial view showing the carriage top taken along the lines 7—7 of FIG. 3.
Figures 8, 9, 11A:
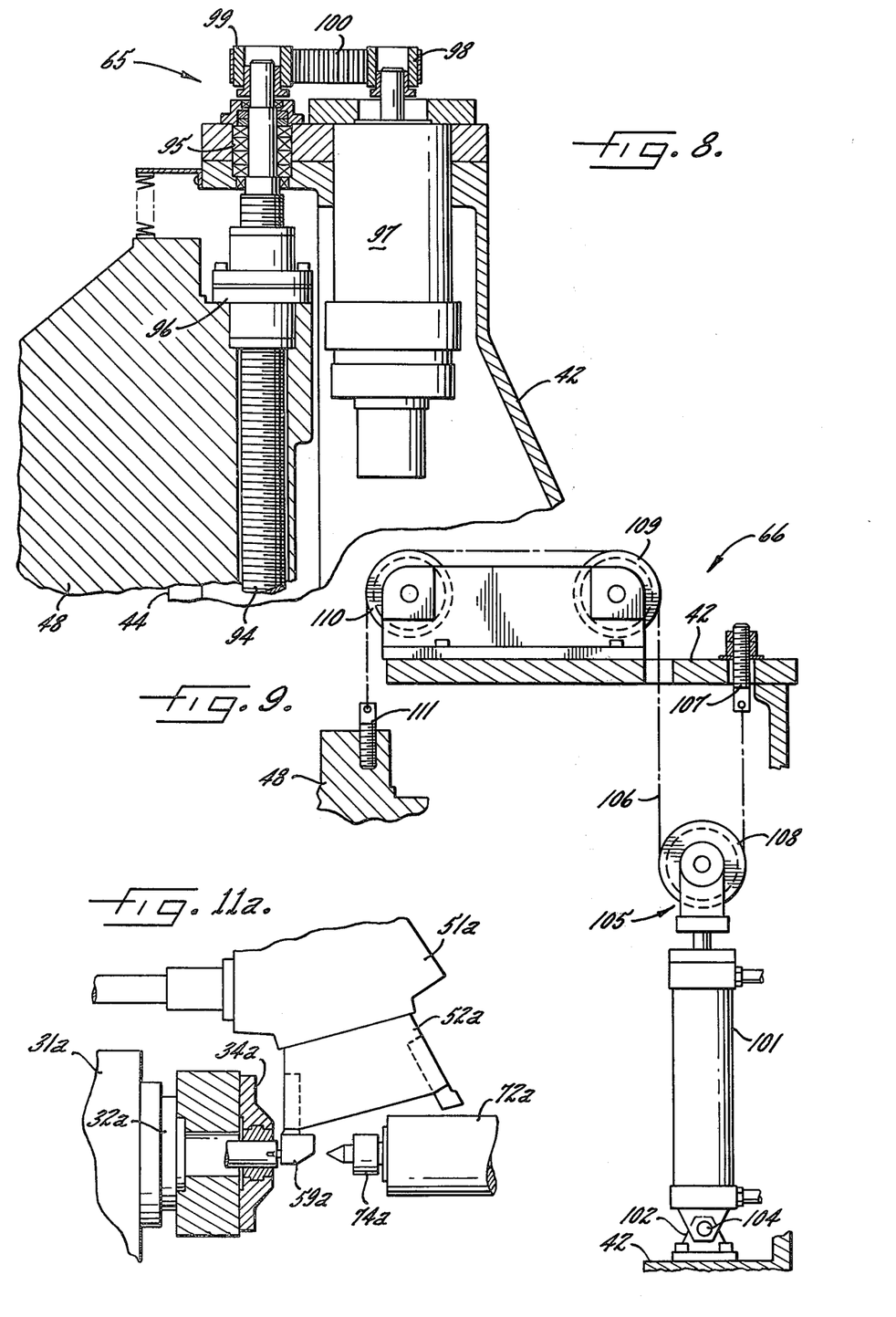
FIG. 8 is a partial sectional view showing the slide drive taken along the lines 8—8 of FIG. 7.
FIG. 9 is a partial sectional view showing the slide counterbalance mechanism taken generally along the lines 9—9 of FIG. 7.
FIGS. 11a–11c are diagrams illustrating a typical application of a lathe constructed in accordance with the invention.

A convenient mounting surface for the slide drive 65 and slide counterbalance assembly 66 is provided by the carriage top which intersects the inclined carriage face at a right angle. The slide drive 65 which is shown in FIGS. 2, 7 and 8, includes a ball screw 94 journalled by means of suitable bearings 95 in the carriage top. A feed nut 96, engaged with the ball screw 94, is securely affixed to the slide 48 by means of suitable bolts. Accordingly, rotation of the ball screw 94 serves to raise or lower the slide 48.

In carrying out the general aim to provide a stable, highly accurate turret lathe, the stability of the carriage is increased by folding back the slide drive within the carriage housing, thereby to lower the center of gravity of the carriage. Accordingly, the relatively elongated slide drive motor 97 is affixed to the carriage top by means of suitable bolts in a parallel relationship to the ball screw 94. For coupling power between the drive motor and the ball screw, timing belt pulleys 98, 99 are affixed to the shafts of the drive motor and ball screw respectively, and coupled by means of a timing belt 100.

For decreasing the load on the slide drive 65, a slide counterbalance assembly 66 is provided. As best shown in FIG. 9, the counterbalance assembly includes a hydraulic cylinder 101 having its lower end secured to a bracket 102 by means of a pin 104, the bracket in turn being secured to the carriage. Affixed to the piston rod of the cylinder 101 is a pulley assembly generally indicated at 105. A length of chain 106 has a first end affixed to the carriage at 107, and follows a path around sheave 108 of pulley assembly 105, and around sheaves 109 and 110 affixed to the carriage top, the other end of the chain being affixed to the top of the tool slide 48 at 111. Hydraulic pressure is applied to the cylinder 101 and is adjusted so that the assembly effectively counterbalances the weight of slide 48. It will be appreciated that the illustrated counterbalance linkage utilizing floating pulley 105 doubles the effective stroke of cylinder 101, thereby allowing the counterbalance assembly to be folded within the carriage chamber.

Position feedback for the tool slide is accomplished utilizing an Inductosyn system similar to that described in conjunction with the carriage. FIG. 7 shows a linear feedback scale 103 suitably affixed to the carriage housing in a parallel relationship to the slideways. The scale 103 operates in conjunction with a slider 107 affixed to the slide assembly for providing position information to the numerical control.

Focusing now upon the tool slide in more detail, it is shown in FIGS. 1 and 7 that the tool slide includes a pair of way slots 112, 114, which are provided with plane bearings similar to the carriage way bearings. Upstanding in a perpendicular fashion from the face of the tool slide 48 is a generally cylindrical housing 50 for supporting the turret mechanism generally indicated at 49. The housing 50 is dimensioned, and the turret assembly positioned therein in such a way that the axis about which the turret rotates intersects the spindle axis. It is seen that the lower portion of the turret housing 50 is cut at an acute angle thereby to skew the turret axis with respect to the spindle axis. The turning tool block 52 and end working tool block 51 are mounted in stacked configuration to share the turret axis below the turret housing 50. As described above, the frusto-conical shape of the tool blocks compensates for the skew angle of the turret axis. It will, therefore, be apparent that a tool is indexed to the operative position by rotating the turret to bring the selected tool to the position closest to the chuck face. In such relationship, positioning of the carriage serves to move the tool axially with respect to the workpiece, while positioning of the tool slide 48 serves to move the tool radially with respect to the workpiece.

Figure 10:
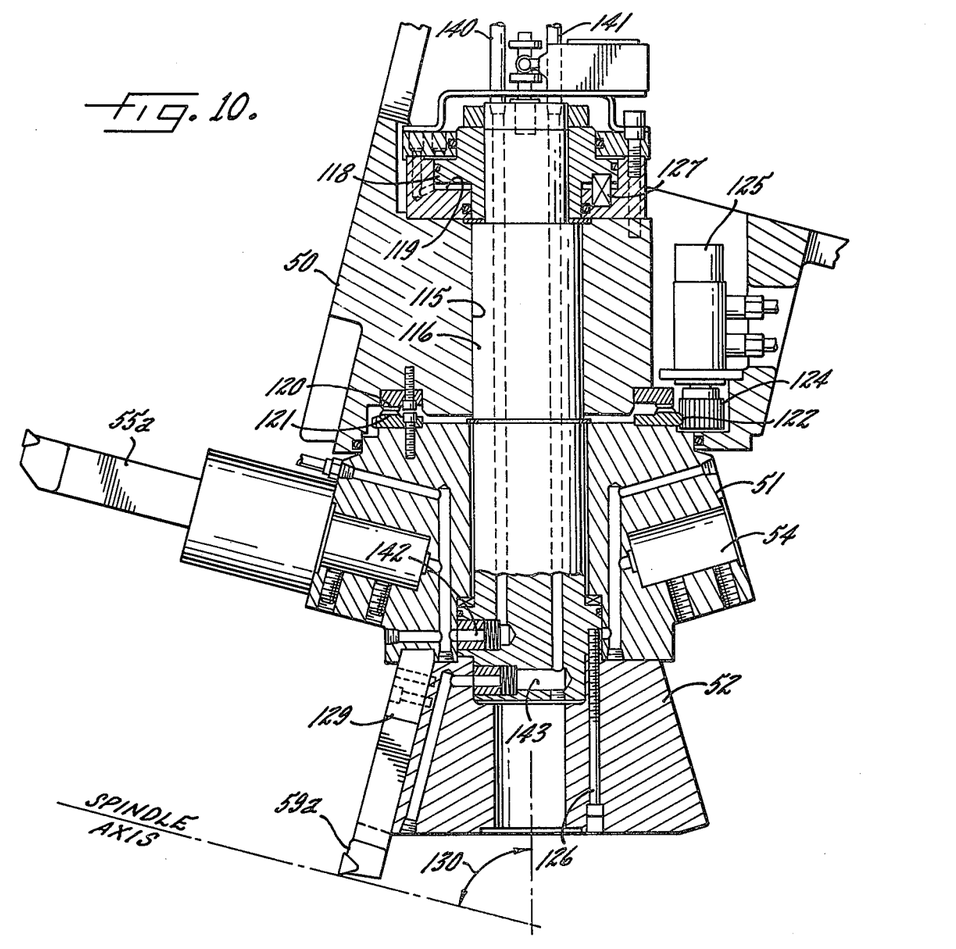
FIG. 10 is a sectional view showing the turret mechanism taken generally along the lines 10—10 of FIG. 7.

For efficiently indexing the various tools into an operative position and clamping the selected tool in that position, a turret assembly as illustrated in FIG. 10 is provided. The turret housing 50 includes an internal bore 115 in which a piston rod 116 is mounted for limited axial reciprocation. The upper portion of the piston rod 116 includes a flanged piston head 118 snugly mounted within a cylinder 119. Fluid pressure may be applied to either the top or bottom of the piston head by hydraulic circuitry (not shown). Rotatably carried on the lower portion of the piston rod 116 is the upper tool holder 51.

For establishing a plurality of precisely defined index positions, a pair of crown gears 120, 121 are arranged to locate the rotatable portion of the turret with respect to the fixed housing portion thereof. Accordingly, the fixed crown gear 120 is securely bolted to the housing 50, and the rotatable crown gear 121 is affixed to the upper tool holder 51 as shown. The application of hydraulic pressure to the underside of the piston 118 firmly enmeshes the crown gears thereby to clamp the turret in a precisely defined position. When it is desired to index the turret to a new position, hydraulic pressure is applied to the upper side of the piston . 118, driving the piston rod and tool holders downward thereby to unmesh the crown gears 120, 121. The crown gear 121 includes a ring gear portion 122 formed on the outer periphery thereof. Enmeshed with the ring gear 122 is a pinion 124 driven by a hydraulic indexing motor 125. The motor 125 serves to rotate the tool holders on the piston rod by means of the ring gear 122, to index a new tool into the operative position. Means such as a resolver are provided for measuring the amount of turret indexing, the numerical control serving to stop the motor 125 and move the piston 118 to its clamped position to securely lock a new selected tool into the operative position.

The lower tool holder 52 is securely affixed to the upper tool holder 51 by means of a series of bolts 126. This arrangement not only securely locks the lower tool holder to the turret assembly, but provides for relatively easy removal of the turning tool holder with attached tools in the event it is desired to substitute a new fully tooled holder. A locating key 129 is fitted into one of the tool slots and engages a slot formed in the upper tool holder for locating the lower tool holder in a precisely aligned position with respect to the upper tool holder.

As a further feature of the turret assembly, a series of springs 127 are arranged to oppose downward movement of the piston 118. The spring force, which may be overcome by the hydraulic force applied to the piston is provided as a safety feature, to prevent inadvertent turret rotation by keeping the crown gears enmeshed when the lathe is shut down and hydraulic pressure removed. The turret mechanism hydraulic system may provide a further safety feature by incorporating a pilot controlled check valve in the hydraulic line feeding the lower or clamp side of piston 118. In the event hydraulic pressure is lost while making a cut, the check valve will serve to keep the turret clamped in the operative position.

Also included within the turret are dual coolant feed systems 140, 141 adapted to provide coolant to the upper and lower tool blocks respectively. The coolant systems are each provided with an internal distributer 142, 143 respectively so that coolant is provided only to the operating tool.

The features and advantages of the improved turret configuration will be further described with reference to FIGS. 1 and 10. As described above, the tool blocks 51, 52 are generally frusto-conical in shape, and are stacked to share an axis common with the axis of the turret. As best seen in FIG. 10, the turret axis is skewed with respect to the horizontal spindle axis. In a preferred embodiment, the angle formed between the turret axis and the spindle axis indicated at 130 is about 75°. It is further seen that the angle of the conical taper of each of the tool holders is arranged to complement the skew angle formed between the spindle axis and turret axis, resulting in a conical taper of about 15°.

Each of the tools mounted in the stacked tool holder may be indexed to an operative position, FIG. 10 illustrating that the above described arrangement serves to properly orient the operative tool with respect to the spindle axis. It is seen that end working tool 55a, disposed in the operative tool socket in upper tool block 51, has its axis parallel to the spindle axis. Accordingly, the carriage and slide may be positioned such that the end working tool is properly presented to the rotational axis of the workpiece. Similarly, turning tool 59a is presented to the spindle axis, and thereby to the rotating workpiece in a right angle relationship, such that lowering of the slide will serve to move the tool 59a in a radial direction toward the spindle axis, while translation of the carriage will serve to move the tool parallel to the spindle axis.

As a further feature of the turret configuration, it is seen that the diameter of the lower frusto-conical tool block 52 is made smaller than that of the upper tool block 51. While the diameter of the upper tool block is generally established by the diameter of the turret housing 50, the diameter of the lower tool block may be reduced to achieve certain advantages. Not only is a measurable increase in turning capacity of the machine realized, but the forces resulting from turning operations are brought closer to the turret axis. Finally, the arrangement allows certain flexibility in establishing the tooling capacity of the machine. Whereas the elongated tool blocks which have been used on occasion heretofore have allowed a two level tool arrangement, those systems have generally dictated that the same number of tool positions be present in both the upper and lower level. However, the instant system may be arranged to provide a different number of tool positions in the respective tool holders. In the illustrated preferred embodiment, six positions are provided for end working tools in the upper tool block while eight positions are provided for turning tools in the lower tool block. Not only does this provide sufficient tooling to meet most requirements, but also is fully compatible with a 48 tooth crown gear (120, 121) turret clamping arrangement.

Also of note with respect to the tool configuration, and best illustrated in FIG. 1, is the relieved area 131 formed in the face of the tool slide for allowing the passage of turning tools between the turret and tool slide face. It is seen that the area is relieved in a way to allow the angular traverse of the end working tools while still providing a robust assembly.

Figure 11B:
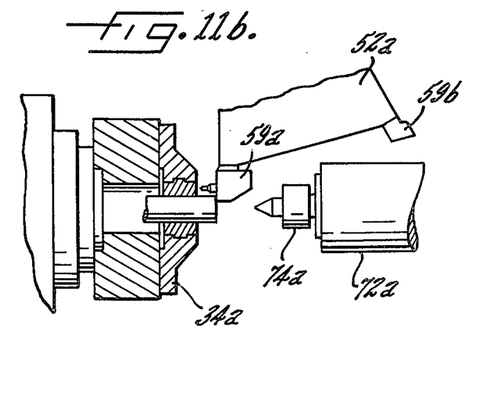
Figure 11C:
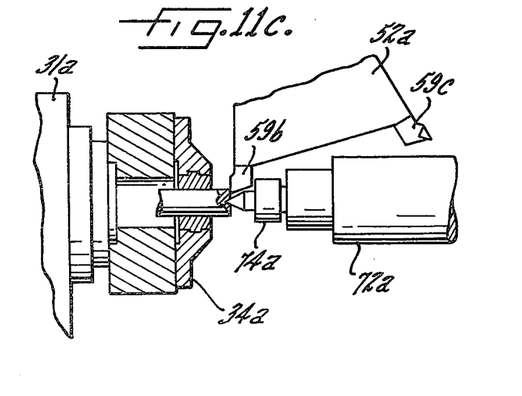

Turning finally to the diagrammatic illustrations 11a–11c, a typical application of the above described turret lathe will be set forth. The illustrated application utilizes a power operated collet chuck 34a, a spindle 32a providing an aperture through the headstock for feeding a shaft, and a commercially available shaft feeder (not shown). The numerical control causes the shaft to be chucked as illustrated in FIG. 11a whereupon the carriage, slide and turret are positioned to bring centering tool 59a into position on the axis of the workpiece. The carriage is advanced toward the chuck so that the centering tool machines a supporting center in the end of the workpiece. The position of the tailstock 72a illustrates the clearance advantages achieved by the illustrated configuration. After centering the workpiece, the carriage is retracted from the chuck face, and the tool slide raised to achieve the position illustrated in FIG. 11b. The collet chuck is opened, and the workpiece fed into the lathe, the tool 59a serving as a workpiece stop. After the feeding operation, the collet chuck is again closed, the tool slide slightly raised, and the turret indexed to bring tool 59b into an operative position as illustrated in FIG. 11c. The tailstock 72a is advanced toward the workpiece causing the quill 74a to engage the supporting center. The machining operations are then performed using the tool 59b, and one or more other tools 59c etc. While it may be uncommon to utilize a tailstock to support the short workpiece illustrated, the diagrams serve to illustrate the reduction or elimination of interference described above. It should also be noted that the end working turret might have been brought into play in FIG. 11a to perform the centering operation or other ID work which might have been required.

It will now be appreciated that what has been provided is a turret lathe having an improved configuration yielding substantial versatility. The slant arrangement is achieved without the need for unduly raising the height of the bed, or overly complicating the machine. A plurality of tools, both turning tools and end working tools are arranged in a manner yielding minimal interference from non-working tools. The overall configuration and the number of tools provided allows the machine to be efficiently used for chucking work using the end working tool holder, for bar work using the turning holder, for shaft work using the turning tool holder and the tailstock, or for any combination of the above.

We claim as our invention:

1. In a turret lathe for machining a workpiece by engaging the workpiece with tools while rotating said workpiece about a horizontal spindle axis, the combination comprising, a bed, a pair of bed ways supported on the bed in a horizontal plane, said bed ways being parallel to the spindle axis but offset therefrom, a carriage mounted for rectilinear translation on the bed ways, the carriage having a pair of parallel slide ways defining a slant plane parallel to the spindle axis but inclined with respect to the plane of the bed ways, a slide mounted for rectilinear translation on the slide ways, a tool holding turret on the slide having an axis intersecting the spindle axis but skewed with respect thereto, the tool holding turret including means for compensating for the skew angle of the turret axis to present a selected tool to the workpiece in a non-skewed attitude.

2. The combination as set forth in claim 1 wherein the carriage defines a cavity generally included between the horizontal plane of the bed ways and the slant plane of the slide ways, and further including a feed screw supported by the carriage for rotation about an axis parallel to the plane of the slide ways, a feed nut affixed to the slide and engaging the feed screw, a motor folded back within the cavity, and means coupling the feed screw and the motor for causing the rectilinear translation of the slide.

3. The combination as set forth in claim 1 further including a tail stock, means for supporting the tail stock for rectilinear translation along the spindle axis, the skew angle minimizing interference between the tail stock and the turret.

4. The combination as set forth in claim 3 wherein the tail stock support means comprises a pair of auxiliary ways supported by the bed in a horizontal plane below the spindle axis.

5. In a turret lathe for machining a workpiece by engaging the workpiece with tools while rotating said workpiece about a horizontal spindle axis, the combination comprising, a bed, a pair of bed ways supported on the bed in a horizontal plane, said bed ways being parallel to the spindle axis but offset to the rear thereof, a carriage mounted for rectilinear translation on the bed ways, the carriage having a pair of slide ways defining a slant plane parallel to the spindle axis but inclined with respect to the vertical away from the spindle axis, a tool slide mounted for rectilinear translation on the slide ways, a turret on the tool slide having a turret axis intersecting the spindle axis but skewed with respect thereto, the turret having first and second stacked toolholders sharing the turret axis, the toolholders being frusto-conical in shape with the conical taper being adapted to compensate for the skew of the turret.

6. In a turret lathe for machining a workpiece by engaging the workpiece with tools while rotating said workpiece about a horizontal spindle axis, the combination comprising, a supporting bed, a pair of bed ways supported by the bed in a horizontal plane, the bed ways being parallel to the spindle axis and offset to the rear thereof, a carriage mounted for rectilinear translation on the bed ways, the carriage including a pair of parallel generally upwardly directed slide ways supported on the face thereof, the slide ways defining a plane parallel to the spindle axis but inclined from the vertical, a tool slide mounted for rectilinear translation on the slide ways, a turret on the tool slide and having a turret axis intersecting the spindle axis but inclined at an acute angle thereto, the turret having first and second tool blocks arranged in stacked configuration with the tool block axes common to the turret axis, the tool blocks being frusto-conical in shape with a plurality of regularly spaced flats formed on the conical surface thereof, the angle of taper of the cones being complementary to the angle of skew of the turret axis, and means for indexing the turret to bring a selected tool into a non-skewed operative position with respect to the spindle axis.

7. A turret lathe comprising in combination, a bed, a headstock affixed to the bed, a spindle supported for rotation within the headstock, a spindle drive, a chuck secured to the spindle for engaging a workpiece thereby to rotate the workpiece about the spindle axis, a pair of bed ways supported by the bed in a horizontal plane, said bed ways being parallel to but offset behind the spindle axis, a carriage mounted on the bed ways, a carriage drive for translating the carriage along the bed ways, a pair of parallel slide ways on the front face of the carriage, the slide ways defining a plane which is parallel to the spindle axis but rearwardly inclined from the vertical, a tool slide mounted on the slide ways, a slide drive for translating the tool slide along the slide ways, a turret mounted for rotation on the tool slide and having a turret axis parallel to the plane of the slide ways and intersecting the spindle axis at an acute angle, tool holding means for holding a plurality of tools, the tool holding means being affixed to the turret for rotation thereby to index a selected tool into an operative position, the tool holding means being angularly formed for compensating for the skewed turret axis.

8. The turret lathe as set forth in claim 7 further including a pair of auxiliary ways parallel to the spindle axis and arranged in a horizontal plane below the spindle axis, and a tail stock supported for rectilinear translation on the auxiliary ways, the angle of turret axis skew minimizing interference between the tail stock and the turret.

9. The turret lathe as set forth in claim 7 wherein the tool holding means comprises a first and a second tool block arranged in stacked configuration, each of said tool blocks being of frusto-conical shape and having a plurality of regularly spaced flats on the surface thereof, the axes of the first and second tool blocks being common to the turret axis, the angle of taper of the cones being complementary to the angle of turret axis skew.

10. The turret lathe as set forth in claim 9 wherein the upper tool block includes a plurality of tool sockets, one of said tool sockets being disposed on each flat of the tool block, the tool sockets being normal to the faces of the respective flats, the first tool block thereby being adapted to carry a plurality of end working tools, the lower tool block including a plurality of slots formed in the respective flats for carrying a plurality of turning tools.

11. The turret lathe as set forth in claim 10 wherein the lower tool block has a smaller diameter than the upper tool block.

12. The turret lathe as set forth in claim 10 wherein the headstock is relieved to reduce interference between non-selected end working tools and the headstock.

13. The turret lathe as set forth in claim 7 wherein the carriage includes a chamber defined behind the plane of the slide ways, the slide drive comprising a feed screw supported by the carriage for rotation about an axis parallel to the slide ways, a feed nut affixed to the slide and engaging the feed screw, and a drive motor coupled to the feed screw for positioning the slide, the drive motor being supported by the carriage in a folded over relationship within the chamber to lower the center of gravity of the carriage.

14. The turret lathe as set forth in claim 13 wherein the slide drive further includes means for counterbalancing the slide, said means comprising a hydraulic cylinder and a linkage folded within the carriage chamber.

15. The turret lathe as set forth in claim 7 wherein the angle at which the plane of the slide ways is inclined from the vertical causes the forces resulting from machining to be directed between the bed ways.

16. The turret lathe as set forth in claim 15 wherein the slide ways are inclined from the vertical at an angle of about 25°.

17. The turret lathe as set forth in claim 7 wherein the angle of intersection between the turret axis and the spindle axis is about 75°.

18. A turret lathe comprising in combination, a bed, a headstock affixed to the bed, a spindle supported for rotation within the headstock, a spindle drive, a chuck secured to the spindle for engaging a workpiece thereby to rotate the workpiece about the spindle axis, a pair of bed ways supported by the bed in a horizontal plane, said bed ways being parallel to but offset behind the spindle axis, a carriage mounted on the bed ways, a carriage drive for translating the carriage along the bed ways, a pair of parallel slide ways on the front face of the carriage, the slide ways defining a plane which is parallel to the spindle axis but rearwardly inclined from the vertical, a tool slide mounted on the slide ways, a slide drive for translating the tool slide along the slide ways, a turret mounted for rotation on the tool slide, tool holding means for holding a plurality of tools, the tool holding means being affixed to the turret for rotation thereby to index a selected tool into an operative position.

* * * * *